US012782663B2

(12) United States Patent
Turner et al.

(10) Patent No.: US 12,782,663 B2
(45) Date of Patent: Nov. 3, 2026

(54) FIBER OPTIC CONNECTOR KIT FOR BUTT CLOSURE

(71) Applicant: AFL Telecommunications LLC, Duncan, SC (US)

(72) Inventors: Kelvin Turner, Williamston, SC (US); Jacob David Hrobak, Greenville, SC (US); Jonathan McAbee, Inman, SC (US)

(73) Assignee: AFL Telecommunications LLC, Duncan, SC (US)

( * ) Notice: Subject to any disclaimer, the term of this patent is extended or adjusted under 35 U.S.C. 154(b) by 329 days.

(21) Appl. No.: 18/391,102

(22) Filed: Dec. 20, 2023

(65) Prior Publication Data

US 2025/0012997 A1 Jan. 9, 2025

Related U.S. Application Data

(60) Provisional application No. 63/525,464, filed on Jul. 7, 2023.

(51) Int. Cl.
*G02B 6/44* (2006.01)

(52) U.S. Cl.
CPC ................................ *G02B 6/44775* (2023.05)

(58) Field of Classification Search
CPC .................................................. G02B 6/44775
See application file for complete search history.

(56) References Cited

U.S. PATENT DOCUMENTS

| | | | |
|---|---|---|---|
| 5,222,183 | A | 6/1993 | Daems et al. |
| 5,793,920 | A | 8/1998 | Wilkins et al. |
| 5,842,891 | A | 12/1998 | Rebers |
| 6,226,436 | B1 | 5/2001 | Daoud et al. |
| 6,628,880 | B2 | 9/2003 | Roberts |
| 6,768,859 | B2 | 7/2004 | Milanowski et al. |
| 6,856,747 | B2 | 2/2005 | Cloud et al. |
| 8,068,711 | B2 | 11/2011 | Sielaff |
| 8,270,799 | B2 | 9/2012 | Drouard |

(Continued)

FOREIGN PATENT DOCUMENTS

| | | | |
|---|---|---|---|
| DE | 4438231 | A1 | 5/1996 |
| DE | 202014000523 | U1 | 4/2015 |

(Continued)

OTHER PUBLICATIONS

European Search Report Corresponding to Application No. 23220504 on Feb. 15, 2024.

*Primary Examiner* — Uyen Chau N Le
*Assistant Examiner* — Hoang Q Tran
(74) *Attorney, Agent, or Firm* — Dority & Manning, P.A.

(57) ABSTRACT

An aspect of the present disclosure is directed to a connector collar for a fiber optic closure. The connector collar is insertable into a cavity at a base of the fiber optic closure. The connector collar includes a shaft extending along a longitudinal axis, the shaft forming a passage extending from a first end and a second end. The passage is configured to receive an optical ground wire (OPGW) cable there-through. The shaft forms a plurality of flanges extending outward along a radial axis to inhibit movement of the collar within the base along the longitudinal axis. The shaft forms a groove configured to position the connector collar relative to the base of the fiber optic closure.

18 Claims, 7 Drawing Sheets

(56) References Cited

U.S. PATENT DOCUMENTS

| | | | |
|---|---|---|---|
| 8,686,289 B2 | 4/2014 | Burke et al. | |
| 8,879,883 B2 | 11/2014 | Parikh et al. | |
| 8,989,550 B2 | 3/2015 | Allen et al. | |
| 9,201,205 B2 | 12/2015 | Bunte | |
| 9,229,186 B2 | 1/2016 | Allen | |
| 9,244,238 B2 | 1/2016 | Claessens et al. | |
| 9,366,837 B2 | 6/2016 | Claessens et al. | |
| 9,640,965 B1 | 5/2017 | Long et al. | |
| 10,180,553 B2 | 1/2019 | Flores et al. | |
| 11,262,520 B2 | 3/2022 | Geens et al. | |
| 11,448,840 B2 | 9/2022 | Becker et al. | |
| 11,677,223 B2 | 6/2023 | Kempeneers et al. | |
| 11,682,503 B2 | 6/2023 | Aoshima et al. | |
| 2007/0079969 A1* | 4/2007 | Allenworth | F16L 3/22 166/368 |
| 2010/0034507 A1 | 2/2010 | Sielaff | |
| 2017/0288383 A1 | 10/2017 | Quesnel | |
| 2020/0088964 A1 | 3/2020 | Desard et al. | |
| 2021/0071737 A1* | 3/2021 | Briskey | H04Q 1/06 |
| 2021/0072481 A1* | 3/2021 | Wittmeier | G02B 6/4444 |
| 2022/0373744 A1* | 11/2022 | Newbury | G02B 6/3879 |
| 2023/0041299 A1 | 2/2023 | Frampton et al. | |
| 2023/0072684 A1 | 3/2023 | Geens et al. | |
| 2023/0170682 A1 | 6/2023 | Wright | |

FOREIGN PATENT DOCUMENTS

| | | | |
|---|---|---|---|
| DE | 202017100359 | U1 | 2/2017 |
| DE | 102019125763 | A1 | 3/2021 |
| EP | 2365367 | B1 | 11/2012 |
| EP | 2533387 | A1 | 12/2012 |
| EP | 2136118 | B1 | 7/2015 |
| EP | 2784559 | B1 | 1/2016 |
| EP | 3106908 | A1 | 12/2016 |
| EP | 2812744 | B1 | 10/2017 |
| EP | 2899576 | B1 | 10/2018 |
| EP | 2732323 | B1 | 12/2020 |
| EP | 2856233 | B1 | 2/2021 |
| WO | WO2012155359 | A1 | 11/2012 |
| WO | WO2018217461 | A1 | 11/2018 |
| WO | WO2019219827 | A1 | 11/2019 |
| WO | WO2021058789 | A1 | 4/2021 |
| WO | WO2021058790 | A1 | 4/2021 |
| WO | WO2021058791 | A1 | 4/2021 |
| WO | WO2021165345 | A1 | 8/2021 |
| WO | WO2022246258 | A1 | 11/2022 |
| WO | WO2023049165 | A1 | 3/2023 |
| WO | WO2023056286 | A1 | 4/2023 |
| WO | WO2023081527 | A1 | 5/2023 |

* cited by examiner

FIBER OPTIC CONNECTOR KIT FOR BUTT CLOSURE

PRIORITY STATEMENT

The present application claims the benefit of priority to U.S. provisional application No. 63/525,464, filed Jul. 7, 2023, the disclosure of which is incorporated herein in its entirety.

FIELD

The present disclosure relates generally to closures, such as for fiber optic cable connections, and more specifically to improved connection devices for butt closures.

BACKGROUND

Certain closures, referred to as “butt” or “domed” closures, are utilized in outdoor environments to facilitate the connection of transmission cables such as fiber optic cables. The cables enter the closure through a sealed base, and connection of the cable elements occurs within the closure. In the case of fiber optic cables, spliced-together optical fibers are held within the closure.

In many cases, the closure must be sealed to a significant exterior pressure, in some cases to a 20 foot waterhead pressure or more. Further, the closure must accommodate a large range of cables. For example, cable diameters for medium size closures can range from 0.4" to 1.2" and for smaller cables, multiple cables (such as three and/or four) must pass through a single port.

Many known closures use through-holes in the bases thereof with seals that enter into the ports defined in the bases. However, such seals in many cases are not reliable or are difficult to utilize. Additionally, in many cases, known closures require that all seals be sealed and unsealed together as a single sealing system. Still further, movement of the cables during use in a sealed closure can cause damage to the cables and sealing components in the closure.

Accordingly, connection devices for butt closures that address one or more issues above would be beneficial and advantageous. Furthermore, improved connection devices for use with butt closures would be advantageous.

BRIEF DESCRIPTION

Aspects and advantages of the invention will be set forth in part in the following description, or may be obvious from the description, or may be learned through practice of the invention.

An aspect of the present disclosure is directed to a butt closure for a fiber optic cable. The butt closure includes a cover forming an interior and an opening providing access to the interior; a tray assembly insertable into the interior to be disposed within the cover, the tray assembly configured to facilitate fiber optic transmission component connections; a base at least partially insertable along a longitudinal axis into the interior formed by the cover, the base including a first outer surface separated along the longitudinal axis from a second outer surface, the second outer surface proximate to the interior of the cover and the first outer surface distal to the interior along the longitudinal axis, wherein a cavity is formed between the first outer surface and the second outer surface, and wherein the cavity is formed between a pair of sidewalls extending along the longitudinal axis; and a connector collar insertable into the cavity at the base, the connector collar including a shaft extending along the longitudinal axis, the shaft forming a passage extending from a first end proximate to the first outer surface and a second end proximate to the second outer surface, the passage configured to receive a fiber optic cable therethrough, the shaft forming a plurality of flanges extending outward along a radial axis to inhibit movement of the collar within the base along the longitudinal axis, the shaft forming a groove configured to position the connector collar relative to the base.

Another aspect of the present disclosure is directed to a connector collar for a fiber optic closure. The connector collar is insertable into a cavity at a base of the fiber optic closure. The connector collar includes a shaft extending along a longitudinal axis, the shaft forming a passage extending from a first end and a second end. The passage is configured to receive an optical ground wire (OPGW) cable therethrough. The shaft forms a plurality of flanges extending outward along a radial axis to inhibit movement of the collar within the base along the longitudinal axis. The shaft forms a groove configured to position the connector collar relative to the base of the fiber optic closure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

Figure 4:
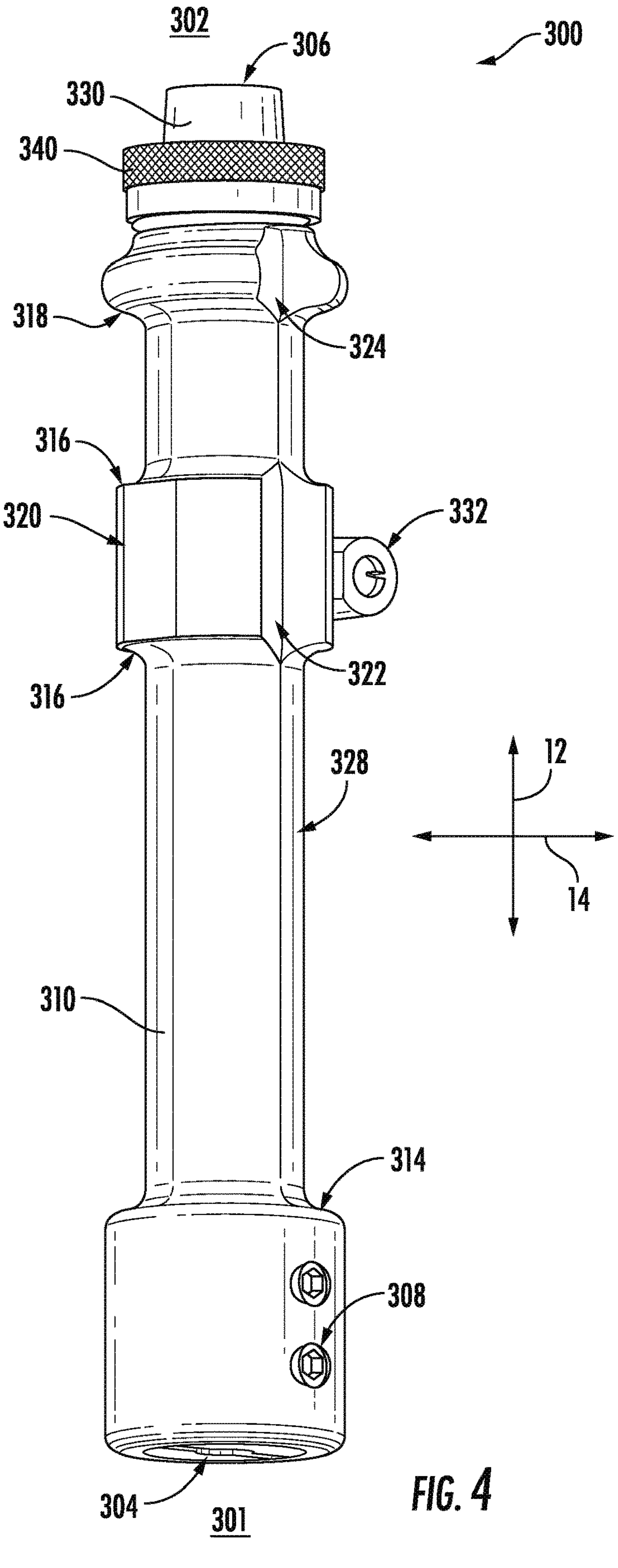
Figure 5:
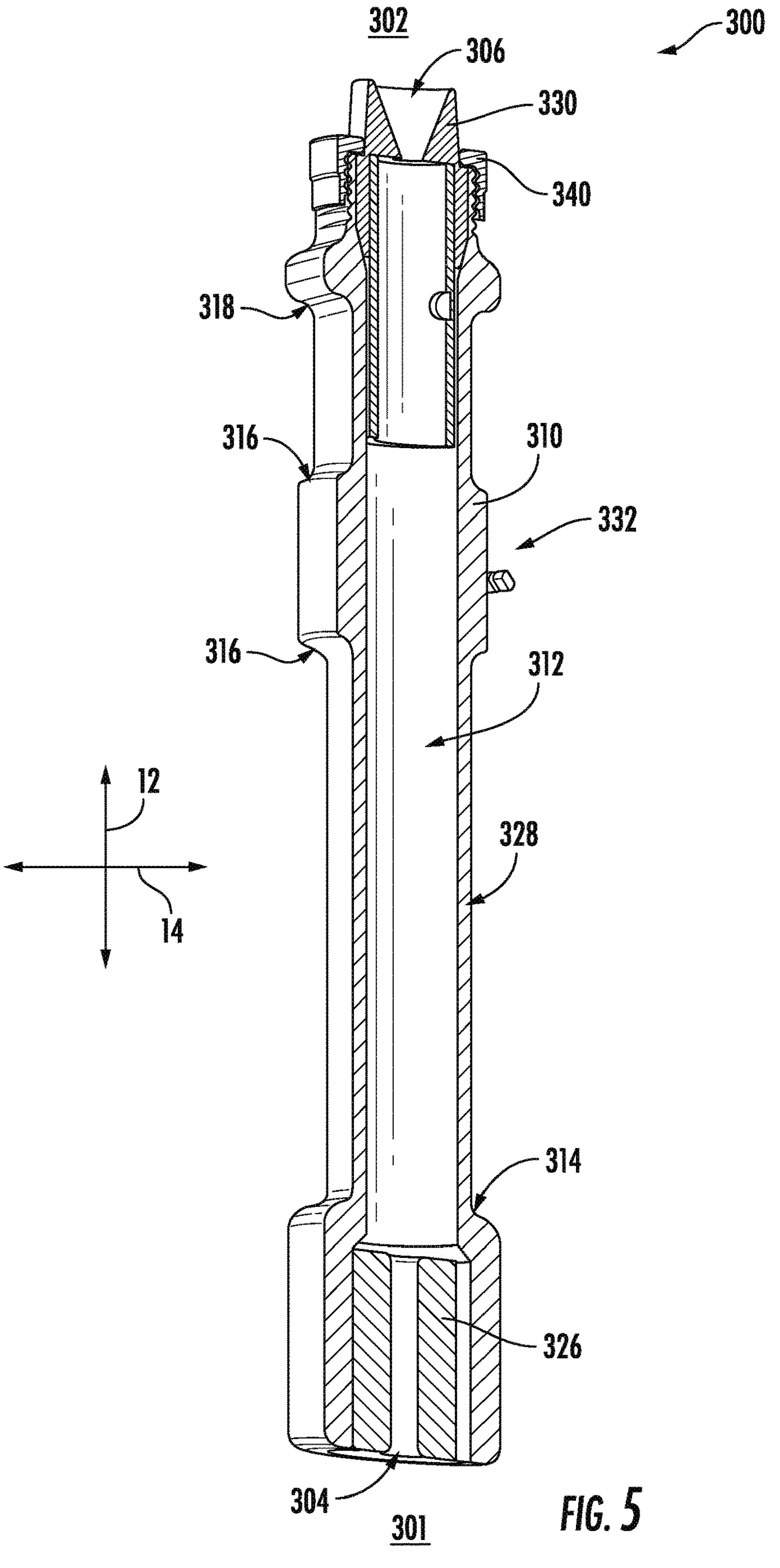
Figure 6:
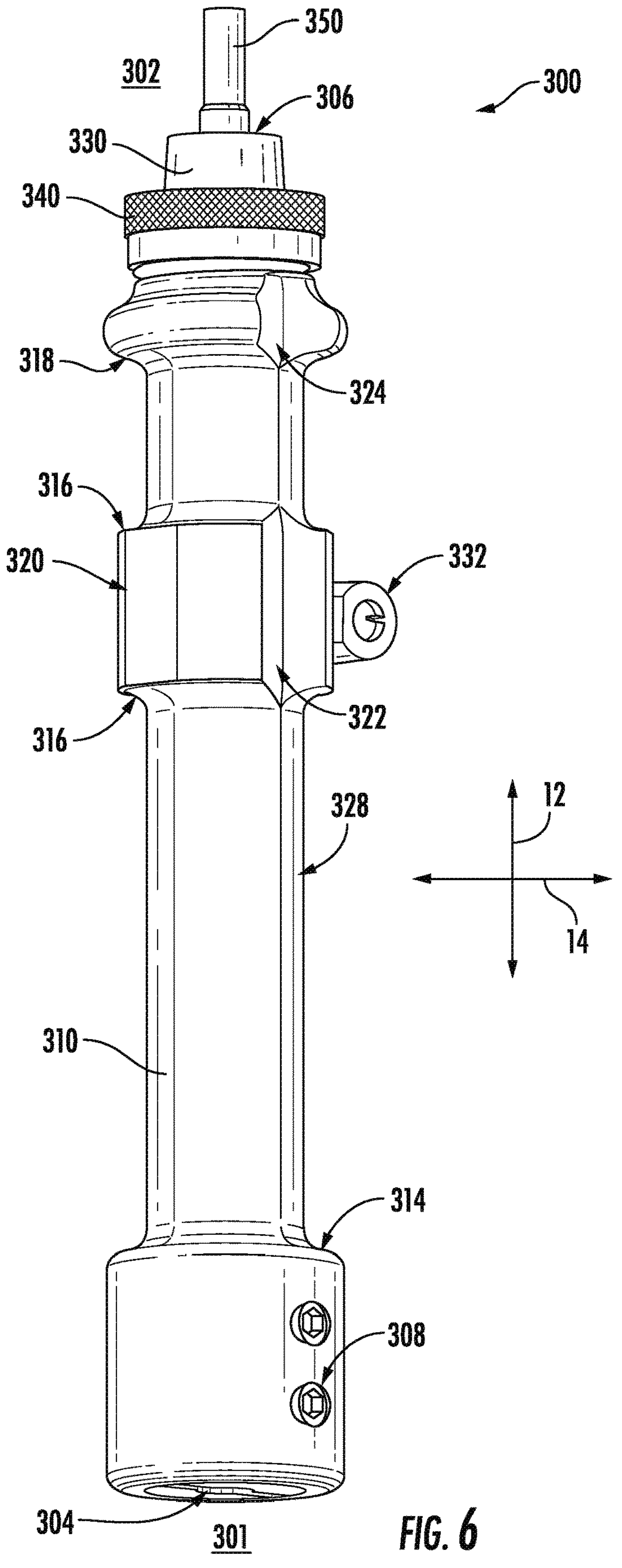
Figure 7:
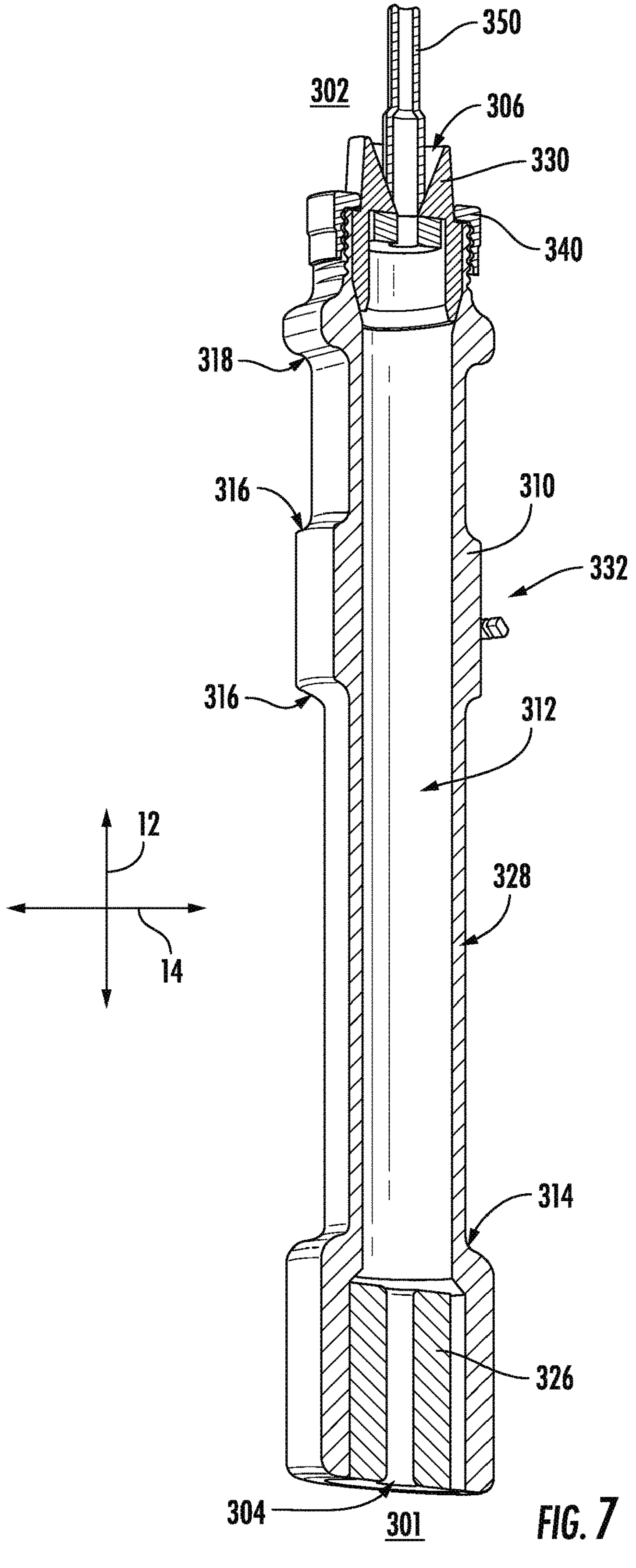

FIG. 4 provides a perspective view of the exemplary connector collar in accordance with aspects of the present disclosure;

FIG. 5 provides a perspective view of the exemplary connector collar in accordance with aspects of the present disclosure;

FIG. 6 provides a perspective view of the exemplary connector collar in accordance with aspects of the present disclosure; and FIG. 7 provides a perspective view of the exemplary connector collar in accordance with aspects of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, embodiments of butt closures 10 including a connector collar 300 in accordance with the present disclosure are provided. Closures 10 in accordance with the present disclosure, and in particular the bases or collars thereof, advantageously provide improved sealing when utilized with a large variety of cable diameters. Additionally, closures, bases, and collars thereof are easy and efficient to utilize in the field, with the installation of cables through a collar and base in a secure, sealed manner being easily and efficiently accomplished.

Various additional advantages of closures, bases, and collars in accordance with the present disclosure include: the use of gel surrounding the collar allows for use of a large range of cable diameters; single-piece collars protect cables extending therethrough from rotation, torsion, shearing, misplacement or displacement of the cables relative to the base or the closure; sealing and protection appropriate for Optical Ground Wire (OPGW) cables, such as to inhibit fluid leakage into the base, the collar, or the closure.

Still further, in exemplary embodiments, features of collars, closures, and bases in accordance with the present disclosure advantageously allow for improved sealing with cables of various diameters, such as OPGW cables, while also mitigating the risk of damage due to cable movement during use. For example, flanges and grooves as discussed herein advantageously mitigates such risk. Further, hard collars (e.g., stainless steel, or other rigid, non-corrosive material) mitigate transferring stresses to the cable, as well as advantageously create a robust seal and generally prevent the cables from damaging other components.

A coordinate system may be defined for a closure 10 and collar 300. Such coordinate system may include a longitudinal axis 12, a radial axis 14, and a circumferential axis 16, as shown.

Figure 1:
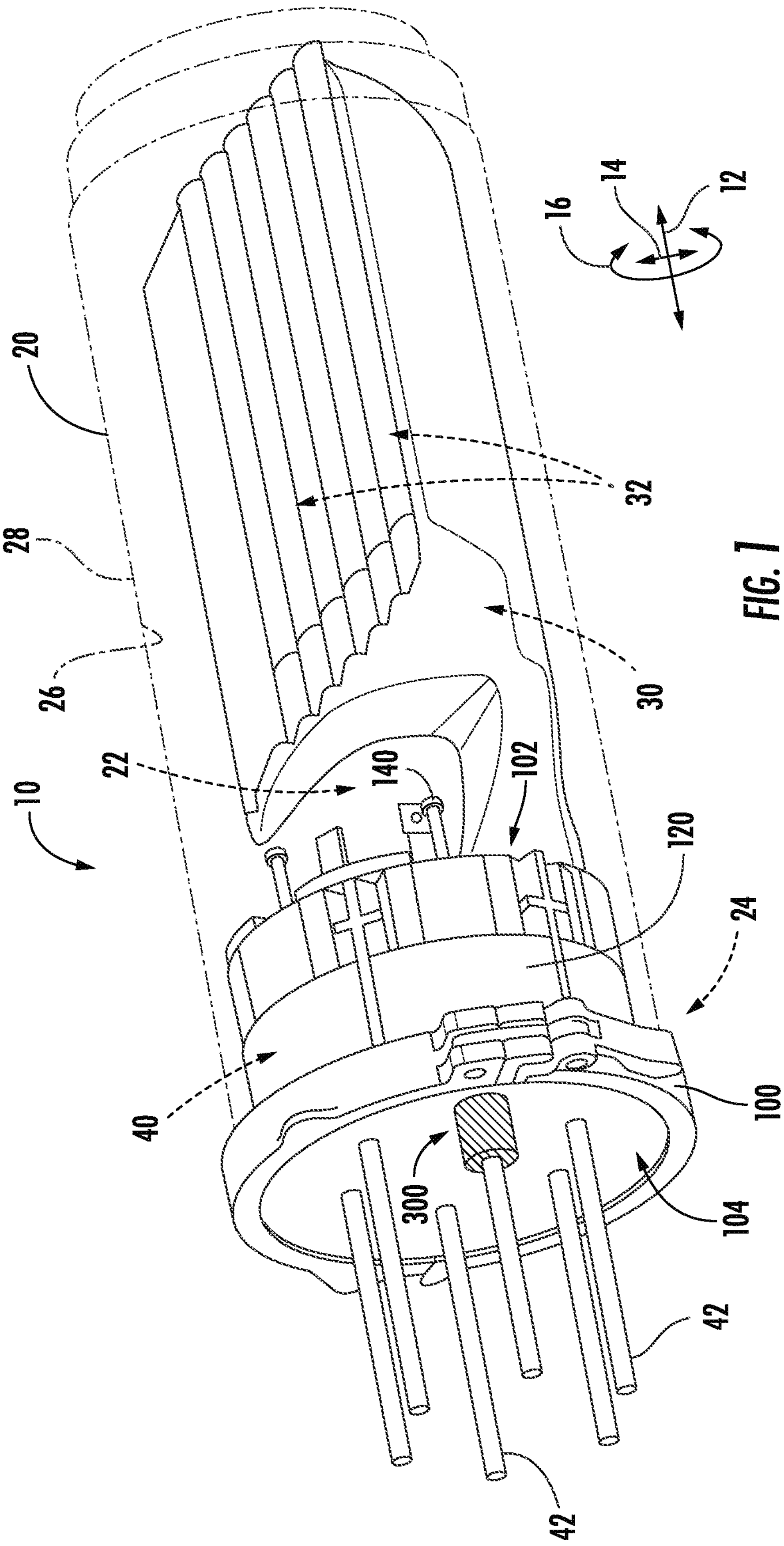
FIG. 1 is a perspective view of a butt closure in accordance with embodiments of the present disclosure.

Referring now to FIG. 1, a closure 10 in accordance with the present disclosure includes a cover 20. Cover 20 is generally a domed cover which defines an interior 22 and an opening 24 which provides access to the interior 24. Cover 20 may include an inner surface 26 which defines the interior 22 and an opposing outer surface 28 which is exposed to the external environment.

A tray assembly 30 may be insertable into (and thus disposed within) the interior 22, such as along the longitudinal axis 12. Tray assembly 30 may include one or more splice trays 32 or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22, such as along the longitudinal axis 12. In some embodiments, tray assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22. Accordingly, the base 40 may provide improved sealing around such cables 42, such that leakage of water or other unwanted environmental materials are prevented from entering the interior 22.

Figure 2:
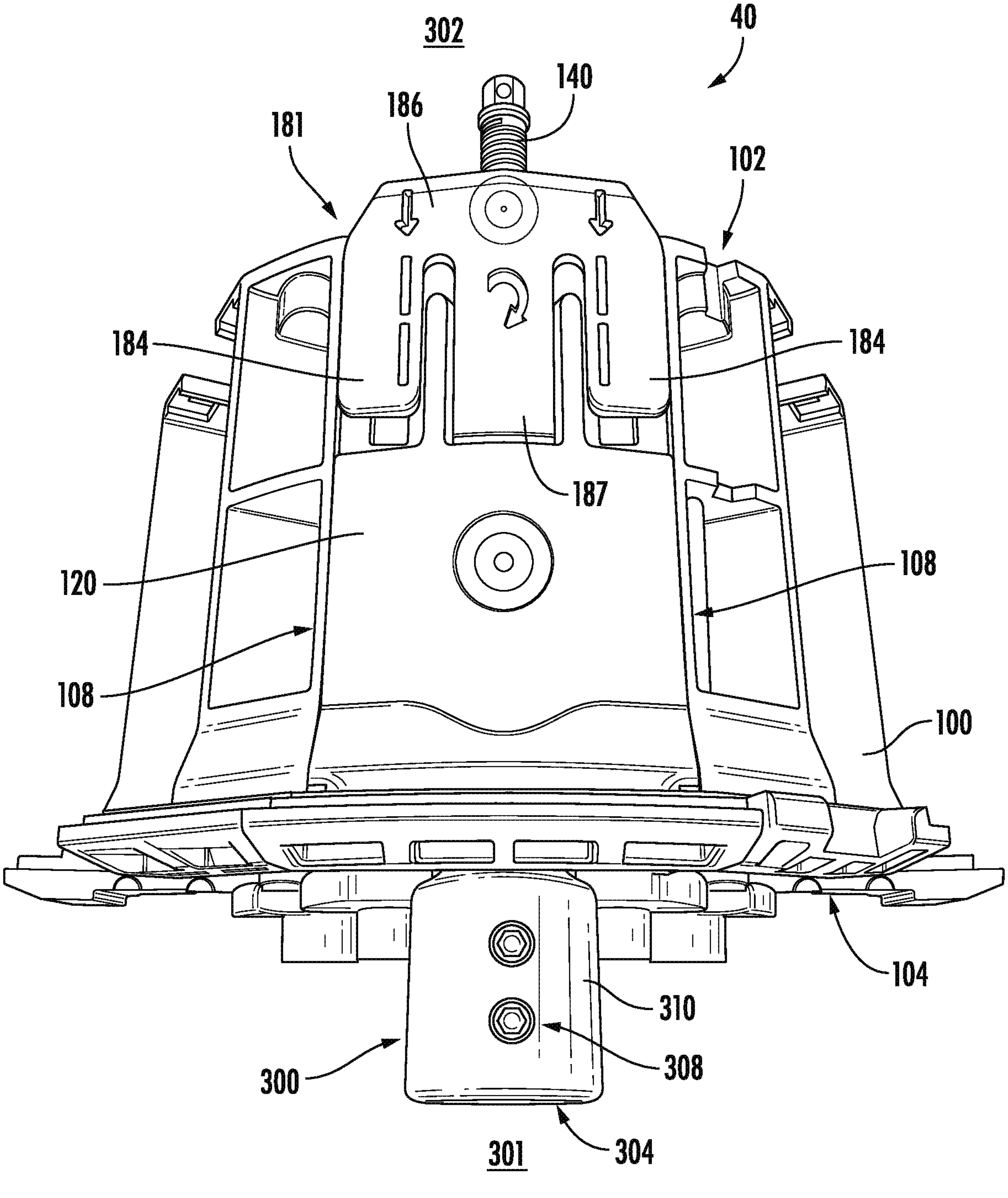
FIG. 2 is a perspective view of a base for a butt closure including an embodiment of a connector collar in accordance with embodiments of the present disclosure.
Figure 3:
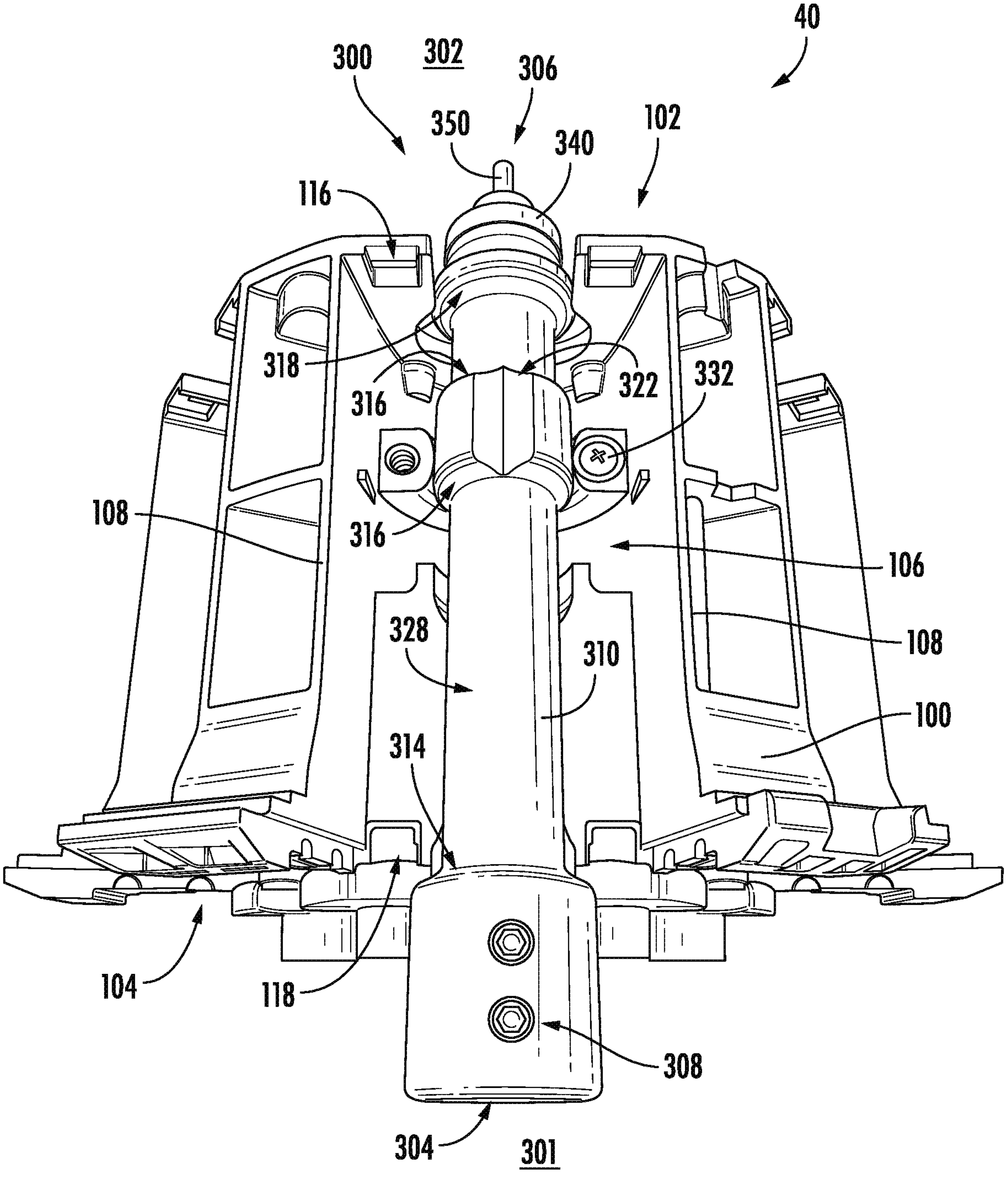
FIG. 3 is a perspective view of the base for the butt closure, with a wedge assembly removed, including an exemplary embodiment of the connector collar in accordance with embodiments of the present disclosure.

Referring now to FIGS. 2-3, details of bases 40 in accordance with embodiments of the present disclosure are provided. As shown in FIG. 3, a base 40 may, for example, include a base housing 100 which extends along the longitudinal axis 12 between a second outer surface 102 and an opposing first outer surface 104. When assembled into a closure 10, the second outer surface 102 may be disposed within the interior 22, and the first outer surface 104 may be within the interior 22 or exterior to the cover 20. First outer surface 104 may be exposed to the external environment surrounding the closure 10.

Between the first and second outer surfaces 102, 104, a plurality of cavities 106 may be defined in the base 40. The cavities 106 may be aligned in an annular array, such as along the circumferential axis 16. The cavities 106 may be spaced apart by sidewalls 108 which extend along the longitudinal axis 12 between the first and second outer surface 102, 104.

Each cavity 106 is designed to receive the connector collar 300 extending therethrough, such as along the longitudinal axis 12. For instance, collar 300 is selectively placeable into the cavity 106. Cavity 106 further includes components for facilitating sealing around such collar 300. Further, the base 40 may include various features for connecting wedge assemblies 120 thereto, each wedge assembly 120 being insertable into a cavity 106 such that the connector collar 300 in the cavity 106 is disposed and sealed between the base housing 100 and the wedge assembly 120.

A gel may be disposed in each cavity 106. The gel may, for example, be a thermoplastic, such as a thermoplastic elastomer, such as a vulcanized thermoplastic elastomer. When the collar 300 is inserted into the cavity 106, the collar 300 may contact the gel such that the gel at least partially surrounds the collar 300.

Each cavity 106 is defined between sidewalls 108. In some embodiments, the opposing sidewalls 108 which define the cavity 106 may extend substantially along the longitudinal axis 12. Additionally, one or more slots 116 may be defined in the base housing 100 adjacent each cavity 106, such as through and/or adjacent the second outer surface 102. Further, one or more passages 118 may be defined in the base housing 100 adjacent each cavity, such as through and/or adjacent the first outer surface 104. The slots 116 and passages 118 may facilitate the connection of wedge assemblies 120 to the base housing 100.

Each wedge assembly 120 is removably insertable into one of the plurality of cavities 106 and removably connectable to the base housing 100. When inserted and connected, the collar 300 including the cable 42 may be sealed within the cavity 106 between the base housing 100 and the wedge assembly 120.

Each wedge assembly 120 may include an outer cover 122 which defines a wedge interior. The gel may be disposed in the wedge interior. When the wedge assembly 120 is inserted and connected to the base housing 100, the interior of the wedge assembly 120 may face and be disposed within the cavity 106. When the collar 300 is inserted into the cavity 106, the gel may at least partially surround the collar 300. The gels may together fully surround the collar 300, in particular when one or both gels is compressed.

In exemplary embodiments, a compression assembly 140 may be operable to compress the wedge assembly 120 onto the base housing 100. Compression assembly 140 may any appropriate springs, actuators, shafts, or threads.

In an exemplary embodiment, the wedge assembly 120 includes a latch assembly 181 having a stop member 187. Stop member 187 may be connected to a latch 184 or bridge

186, and may selectively limit movement of the latch assembly 181 between an engaged position and disengaged position. In exemplary embodiments, the stop member 187 may be connected to and extend from the bridge 186. For example, the stop member 187 may be cantilevered from the bridge 186. In exemplary embodiments, the stop member 187 may be pivotable between a first position (open) and a second position (closed). For example, to move the stop member 187 from the first position to the second position, the stop member 187 may be actuated by a user, such as by the user applying pressure on the stop member 187 such as along a direction perpendicular to the longitudinal axis 12 (e.g., along the radial axis 14). Such pressure may pivot or otherwise move the stop member 187 from the first position to the second position.

Referring now to FIGS. 4-7, perspective views of an exemplary embodiment of the connector collar 300 in accordance with aspects of the present disclosure is provided. The collar 300 includes a shaft 310 extending along the longitudinal axis 12 (relative to installation through the base into the closure). Within the shaft 310, a passage 312 is formed extending from a first end 301 through a second end 302. The second end 302 is relative to an end extending into or proximate to the closure (e.g., closure 10) and the first end 301 is distal to the second end 302 along the longitudinal axis 12 (e.g., outside of the closure 10 and base 40). The cable 42, such as an OPGW cable, is extendable through the collar 300 via passage 312 into the closure, such as through a first end opening 304 at the first end 301 and egressing into the closure through a second end opening 306 at the second end 302. In various embodiments, a seal 326 is positioned at the first end 301 and configured to surround the cable. The seal 326 may form a grommet (e.g., a rubber grommet, collar, cylinder, or block) having a passage corresponding to passage 312 through which the cable is extendable. The seal 326 is placeable into the passage 312 through the first end 301. The seal 326 may be secured within the passage 312 via a fastener 308 extending through an outside surface 328 of the shaft 310 (e.g., fastener 308 extending along radial axis 14 through shaft 10 and into seal 326). A sealant (e.g., room-temperature vulcanizing (RTV) silicone, epoxy, or appropriate sealant) may be placed at passage 312 within and/or around seal 326, such as to mitigate fluid communication into passage 312.

A seal 330 is positioned at the second end 302. A fastener 340, such as a nut, is threadable to the second end 302 of the shaft 310, such as to position at least a portion of the seal 330 between the fastener 340 and the shaft 310. The seal 330 may include a rubber grommet, collar, cylinder, or block having an opening corresponding to passage 312 through which the cable is extendable through the second end opening 306. In some embodiments, a fiber collar 350 forms a shaft and extends the passage 312 therethrough. The collar 350 is placeable at the seal 330, such as at the longitudinal end, to allow the cable to extend through the shaft 310 and egress through the fiber collar 350.

The shaft 310 forms a plurality of radially extended flanges to inhibit movement of the collar 300 and cable along the longitudinal axis 12. For instance, a first end flange 314 is formed extending outward along the radial axis 14 proximate to the first end 301. First end flange 314 may be configured to abut the first outer surface 104 of the base 40. In some embodiments, the seal 326 is positioned between the first end opening 304 and the first end flange 314.

In various embodiments, the shaft 310 forms a second end flange 318 proximate to the second end 302. In some embodiments, the seal 330 and fastener 340 are positioned between the second end opening 306 and the second end flange 318. Second end flange 318 may be configured to abut the second outer surface 102 of the base 40.

In some embodiments, the shaft 310 forms a mid-span flange 316 positioned between the first and second end flanges 314, 318. In various embodiments, a substantially flat surface 320 is positioned at the mid-span flange 316. For instance, the flat surface 320 extends along the longitudinal axis 312. The flat surface 320 may form a chord along a rounded outer surface of the flange 316. In some embodiments, a plurality of flat surfaces 320 is positioned at flange 316 at various circumferential locations.

A groove 322 may be formed extending along the longitudinal axis 12 and extending through the mid-span flange 316. The groove 322 may form a surface extending radially inward from the flange 316. Additionally, or alternatively, the groove may be formed extending along the longitudinal axis 12 through the second end flange 318, such as depicted at groove 324. Grooves 322, 324 may extend along the longitudinal axis 12, such as at substantially the same location along a circumferential direction.

Embodiments of the shaft 310 may form a single, unitary, monolithic component, such as to extend entirely through the base 40 along the longitudinal axis 12 and promote sealing and mitigate fluid communication into the base 40, the closure 10, or at the passage 312 within the shaft 310. In various embodiments, shaft 310 may be formed of a steel material, such as stainless steel.

Embodiments of the connector collar 300 provided herein may form a connector kit allowing for the transfer of fiber optic components inside of an OPGW cable (e.g., cable 42) into a base (e.g., base 40), such as over plastic cables extending through a base and directly exposed to gel or sealants at the base. Flanges, such as flanges 314, 316, 318, mitigate translation along the longitudinal axis 12, such as to prevent undesired movement of connectors and fiber components within the closure 10. Flat surfaces 320 prevent rotation of connectors and fiber components within the closure 10. One or more fasteners 332, such as may be positioned at the mid-span flange 316, may increase torsional resistance. The fastener 332 may couple to one or more surfaces at the base 40, such as within cavity 106. The collar 300 extends into an interior (e.g., cavity 106) of the base 40 and is circumferentially surrounded by a sealing gel, such as to allow for a full 360 degree seal. Groove 322, 324 provides a positioning feature for the shaft 310 relative to the base 40 and the closure 10, such as to mitigate mis-installation, and provide a relief for tightening down the gel layer.

Further aspects of the subject matter are provided in the following clauses:

1. A butt closure for a fiber optic cable, the butt closure including a cover forming an interior and an opening providing access to the interior; a tray assembly insertable into the interior to be disposed within the cover, the tray assembly configured to facilitate fiber optic transmission component connections; a base at least partially insertable along a longitudinal axis into the interior formed by the cover, the base including a first outer surface separated along the longitudinal axis from a second outer surface, the second outer surface proximate to the interior of the cover and the first outer surface distal to the interior along the longitudinal axis, wherein a cavity is formed between the first outer surface and the second outer surface, and wherein the cavity is formed between a pair of sidewalls extending along the longitudinal axis; and a connector collar insertable into the cavity at the base, the connector collar including a shaft extending along the longitudinal axis, the shaft forming a passage extending from a first end proximate to the first outer surface and a second end proximate to the second outer surface, the passage configured to receive a fiber optic cable therethrough, the shaft forming a plurality of flanges extending outward along a radial axis to inhibit movement of the collar within the base along the longitudinal axis, the shaft forming a groove configured to position the connector collar relative to the base.

2. The butt closure of any one or more clauses herein, wherein the groove extends along the longitudinal axis.

3. The butt closure of any one or more clauses herein, wherein the groove extends through a mid-span flange of the plurality of flanges positioned between the first end and the second end of the shaft.

4. The butt closure of any one or more clauses herein, wherein the wedge assembly includes a flange extending along the longitudinal axis corresponding to the groove, the flange receivable at the groove when the wedge assembly is positioned at the cavity at the base.

4. The butt closure of any one or more clauses herein, the connector collar including a first end flange of the plurality of flanges, the first end flange configured to abut the first outer surface of the base.

5. The butt closure of any one or more clauses herein, the connector collar including a second end flange of the plurality of flanges, the second end flange configured to abut the second outer surface of the base.

6. The butt closure of any one or more clauses herein, the connector collar including a seal positioned at the second end, and a fastener threadable onto the second end of the shaft to position at least a portion of the seal between the fastener and the shaft.

7. The butt closure of any one or more clauses herein, the seal including a rubber grommet, a collar, a cylinder, or a block having an opening corresponding to the passage.

8. The butt closure of any one or more clauses herein, the seal configured to extend around a cable extending through the passage through the connector collar.

9. The butt closure of any one or more clauses herein, the connector collar including a seal positioned at the first end, wherein a fastener is extendable along the radial axis through an outer surface of the shaft to extend into the seal, the seal configured to surround the cable positioned through the passage at the shaft.

10. The butt closure of any one or more clauses herein, the plurality of flanges at the connector collar including a mid-span flange positioned between the first end and the second end, the mid-span flange including a flat surface extending along the longitudinal axis.

11. The butt closure of any one or more clauses herein, the flat surface forming a chord along a rounded outer surface of the mid-span flange.

12. The butt closure of any one or more clauses herein, wherein the fiber optic cable is an optical ground wire cable.

13. A connector collar for a fiber optic closure, the connector collar insertable into a cavity at a base of the fiber optic closure, the connector collar including a shaft extending along a longitudinal axis, the shaft forming a passage extending from a first end and a second end, the passage configured to receive an optical ground wire (OPGW) cable therethrough, the shaft forming a plurality of flanges extending outward along a radial axis to inhibit movement of the collar within the base along the longitudinal axis, the shaft forming a groove configured to position the connector collar relative to the base of the fiber optic closure.

14. The connector collar of any one or more clauses herein, wherein the groove extends along the longitudinal axis.

15. The connector collar of any one or more clauses herein, wherein the groove extends through a mid-span flange of the plurality of flanges positioned between the first end and the second end of the shaft.

16. The connector collar of any one or more clauses herein, the connector collar including a first end flange of the plurality of flanges, the first end flange configured to abut the first outer surface of the base.

17. The connector collar of any one or more clauses herein, the connector collar including a second end flange of the plurality of flanges, the second end flange configured to abut the second outer surface of the base.

18. The connector collar of any one or more clauses herein, the connector collar including a seal positioned at the second end and configured to extend around the OPGW cable, and a fastener threadable onto the second end of the shaft to position at least a portion of the seal between the fastener and the shaft.

19. The connector collar of any one or more clauses herein, the connector collar including a seal positioned at the first end, wherein a fastener is extendable along the radial axis through an outer surface of the shaft to extend into the seal, the seal configured to surround the OPGW cable positioned through the passage at the shaft.

20. The connector collar of any one or more clauses herein, the plurality of flanges at the connector collar including a mid-span flange positioned between the first end and the second end, the mid-span flange including a flat surface extending along the longitudinal axis, the flat surface forming a chord along a rounded outer surface of the mid-span flange.

21. A butt closure base including the connector collar any one or more clauses herein.

22. A butt closure including the connector collar of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A butt closure for a fiber optic cable, the butt closure comprising:

a cover forming an interior and an opening providing access to the interior;

a tray assembly insertable into the interior to be disposed within the cover, the tray assembly configured to facilitate fiber optic transmission component connections;

a base at least partially insertable along a longitudinal axis into the interior formed by the cover, the base comprising a first outer surface separated along the longitudinal axis from a second outer surface, the second outer surface proximate to the interior of the cover and the first outer surface distal to the interior along the longitudinal axis, wherein a cavity is formed between the first outer surface and the second outer surface, and wherein the cavity is formed between a pair of sidewalls extending along the longitudinal axis; and a connector collar insertable into the cavity at the base, the connector collar comprising a unitary, monolithic shaft extending along the longitudinal axis, the shaft forming a passage extending from a first end proximate to the first outer surface and a second end proximate to the second outer surface, the passage configured to receive a fiber optic cable to extend through the shaft, the shaft forming a first end flange proximate to the first end and a second end flange proximate to the second end, the second end flange configured to abut the second outer surface, wherein the first and second flanges extend outward along a radial axis to inhibit movement of the connector collar within the base along the longitudinal axis.

2. The butt closure of claim 1, wherein the shaft forms a groove configured to position the connector collar relative to the base, the groove extending along the longitudinal axis.

3. The butt closure of claim 2, wherein the groove extends through a mid-span flange positioned between the first end and the second end of the shaft.

4. The butt closure of claim 3, wherein the base comprises a wedge assembly insertable to the cavity, the wedge assembly comprising a flange extending along the longitudinal axis corresponding to the groove, the flange receivable at the groove when the wedge assembly is positioned at the cavity at the base.

5. The butt closure of claim 1, wherein the first end flange is configured to abut the first outer surface of the base.

6. The butt closure of claim 1, the connector collar comprising a seal positioned at the second end, and a fastener threadable onto the second end of the shaft to position at least a portion of the seal between the fastener and the shaft.

7. The butt closure of claim 6, the seal comprising a rubber grommet, a collar, a cylinder, or a block having an opening corresponding to the passage.

8. The butt closure of claim 6, the seal configured to extend around a cable extending through the passage through the connector collar.

9. The butt closure of claim 1, the connector collar comprising a seal positioned at the first end, wherein a fastener is extendable along the radial axis through an outer surface of the shaft to extend into the seal, the seal configured to surround the cable positioned through the passage at the shaft.

10. The butt closure of claim 1, the connector collar comprising a mid-span flange positioned between the first end and the second end, the mid-span flange comprising a flat surface extending along the longitudinal axis, the flat surface forming a chord along a rounded outer surface of the mid-span flange.

11. The butt closure of claim 1, wherein the fiber optic cable is an optical ground wire cable.

12. A connector collar for a fiber optic closure, the connector collar insertable into a cavity at a base of the fiber optic closure, the connector collar comprising:

a shaft extending along a longitudinal axis, the shaft forming a passage extending from a first end and a second end, the passage configured to receive an optical ground wire (OPGW) cable therethrough, the shaft forming a first end flange proximate to the first end and a second end flange proximate to the second end, wherein the first and second flanges extend outward along a radial axis to inhibit movement of the collar within the base along the longitudinal axis, the shaft comprising a flat surface forming a chord along a rounded outer surface of the shaft.

13. The connector collar of claim 12, the shaft forming a groove, wherein the groove extends substantially along the longitudinal axis.

14. The connector collar of claim 13, wherein the groove extends through a mid-span flange positioned between the first end and the second end of the shaft.

15. The connector collar of claim 12, the first end flange configured to abut a first outer surface of the base, the second end flange configured to abut a second outer surface of the base, the shaft configured to extend along the longitudinal axis between the first and second outer surfaces.

16. The connector collar of claim 12, the connector collar comprising a seal positioned at the second end and configured to extend around the OPGW cable, and a fastener threadable onto the second end of the shaft to position at least a portion of the seal between the fastener and the shaft.

17. The connector collar of claim 12, the connector collar comprising a seal positioned at the first end, wherein a fastener is extendable along the radial axis through an outer surface of the shaft to extend into the seal, the seal configured to surround the OPGW cable positioned through the passage at the shaft.

18. The connector collar of claim 12, the connector collar comprising a seal positioned at the second end, and a fastener threadable onto the second end of the shaft to position at least a portion of the seal between the fastener and the shaft, wherein the shaft comprises a knurled surface.

* * * * *